(No Model.)　　　　　　　　　　　　　　　　　5 Sheets—Sheet 1.
A. B. LANDIS.
GRINDING MACHINE.
No. 544,439.　　　　　　　　　　　　Patented Aug. 13, 1895.
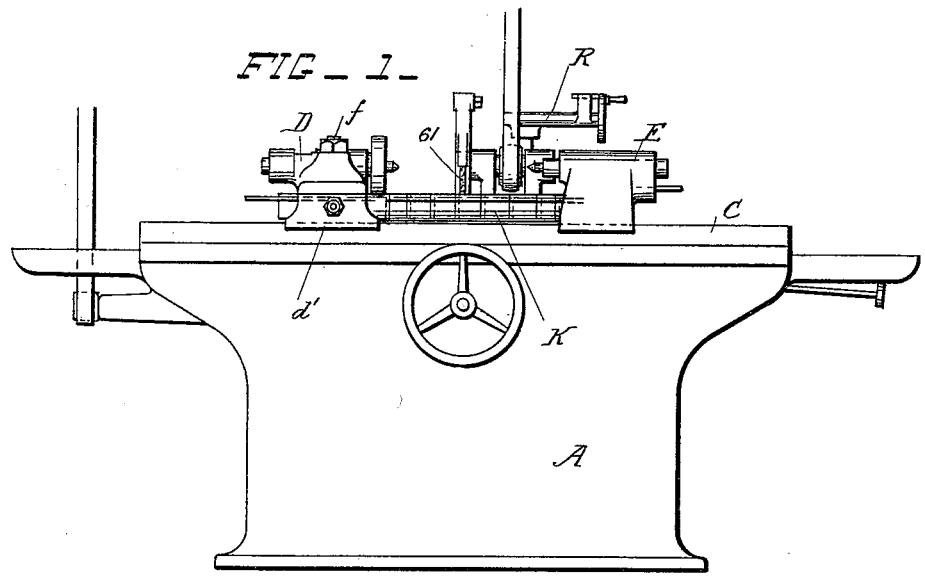
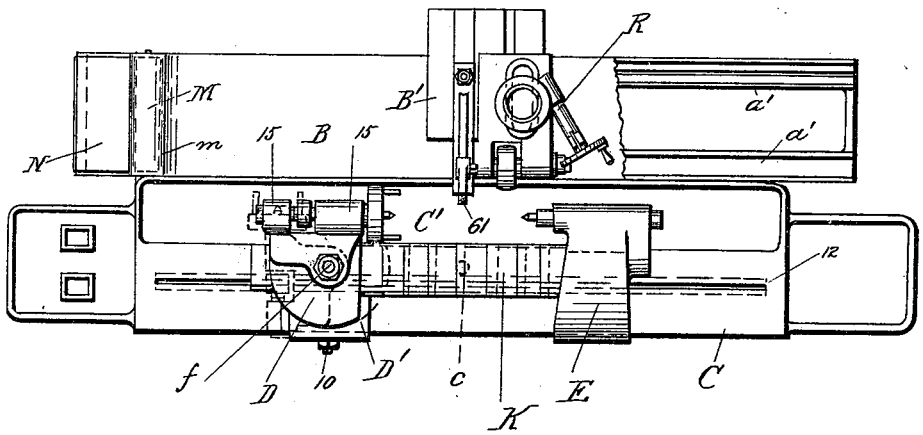
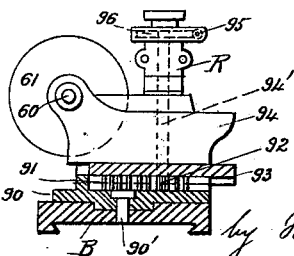
WITNESSES　　　　　　　　　　　　　INVENTOR
W. H. Romavill　　　　　　　　　　　Abraham B. Landis
J. Sprigg Poole　　　　　　　　　by Herbert W. T. Jenner.
　　　　　　　　　　　　　　　　　　　　Attorney

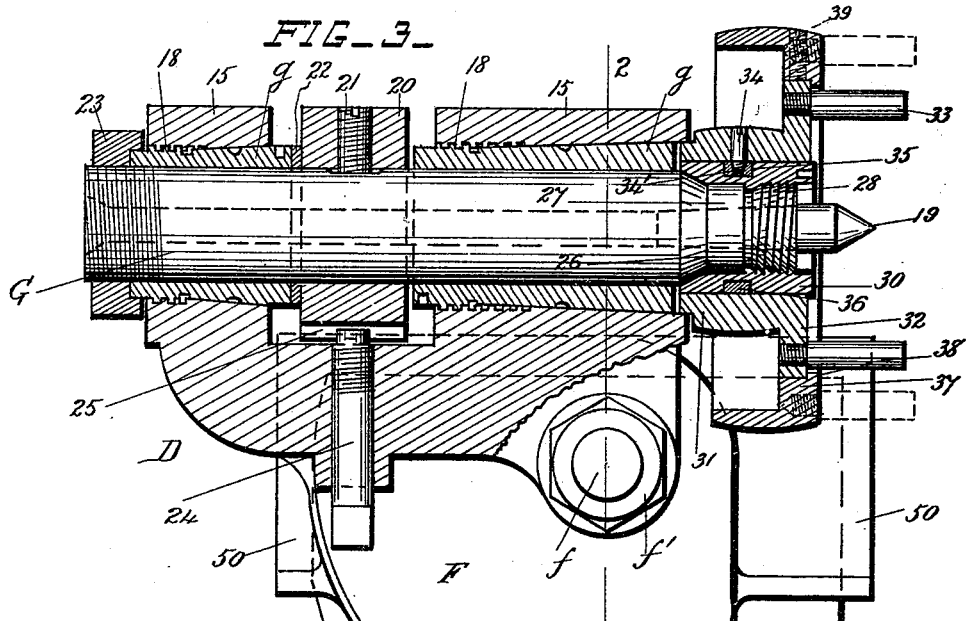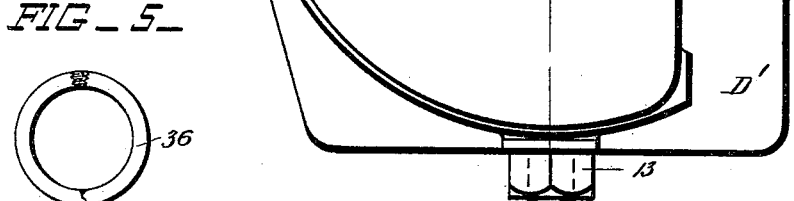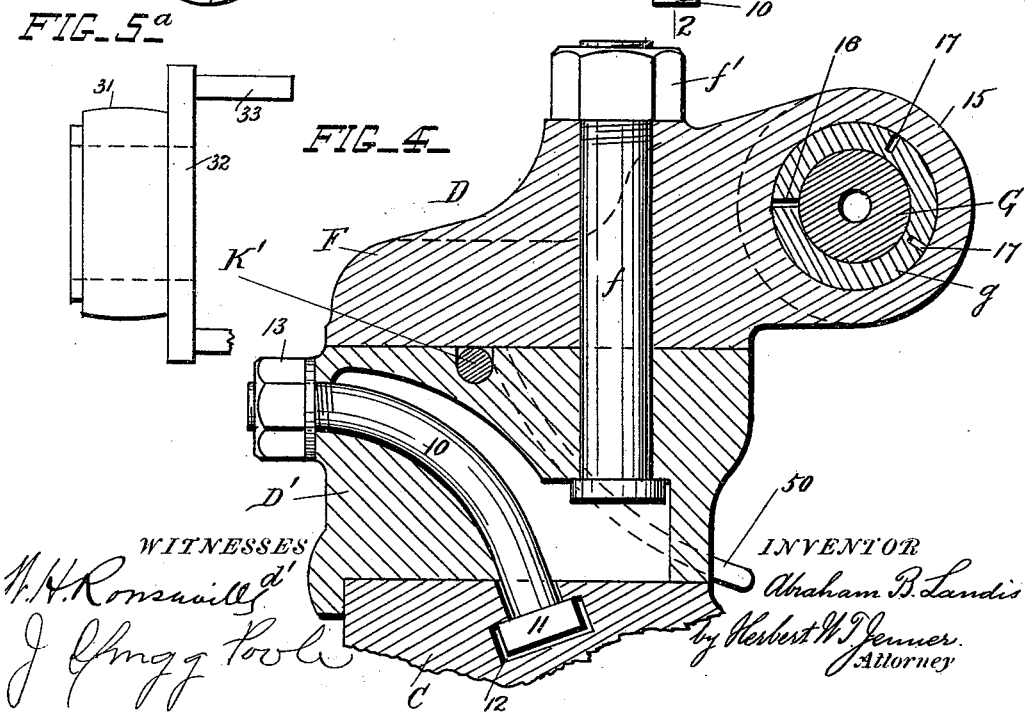

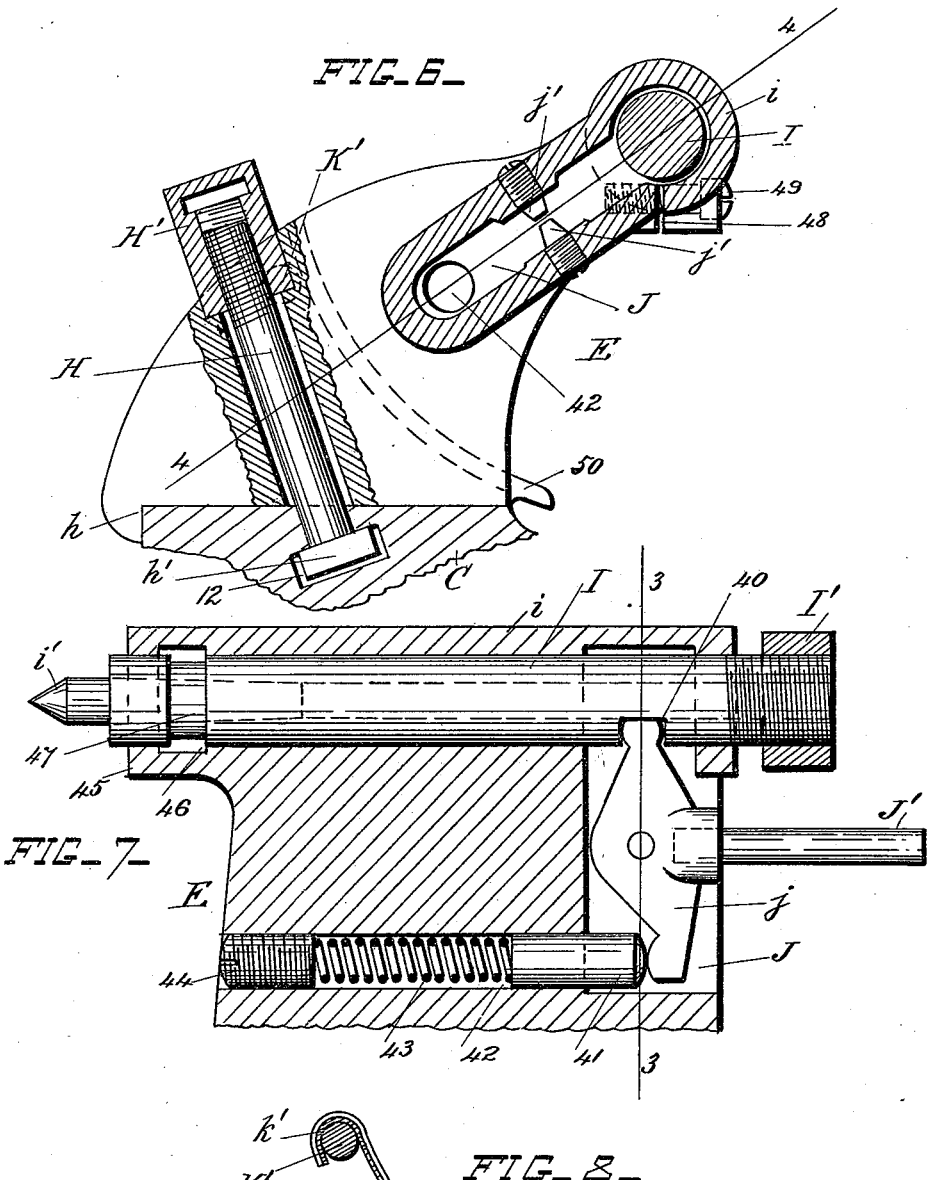

(No Model.) 5 Sheets—Sheet 4.
A. B. LANDIS.
GRINDING MACHINE.
No. 544,439. Patented Aug. 13, 1895.
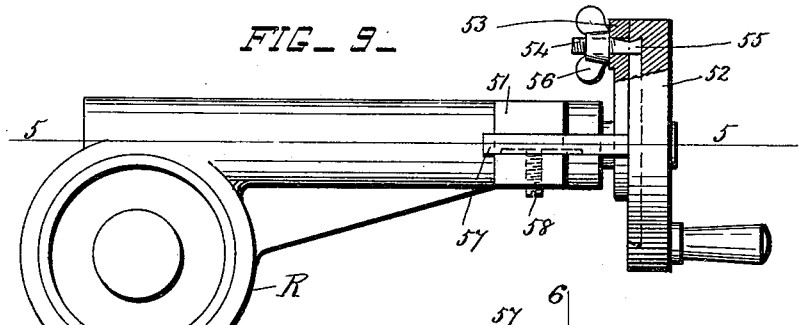
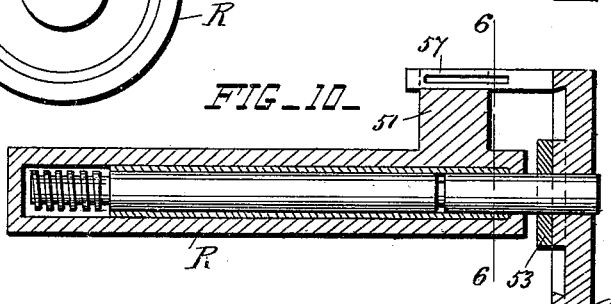
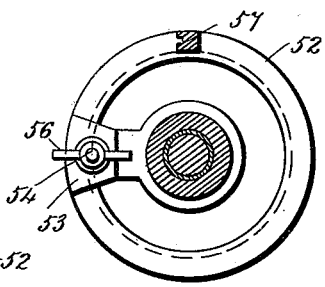
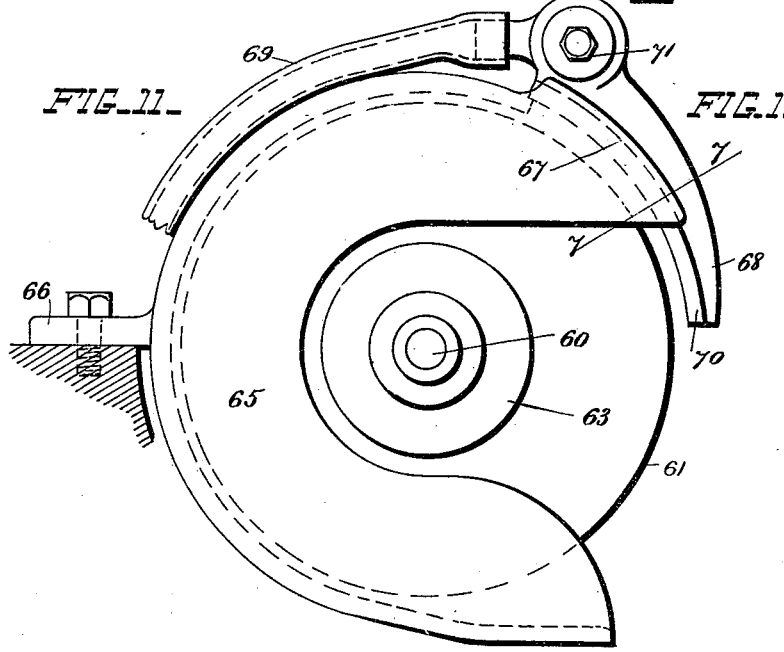
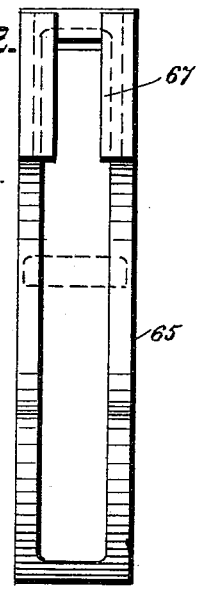
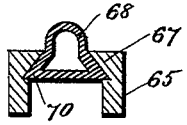
WITNESSES
INVENTOR
Abraham B. Landis
by Herbert W. T. Jenner
Attorney (No Model.) 5 Sheets—Sheet 5.
A. B. LANDIS.
GRINDING MACHINE.
No. 544,439. Patented Aug. 13, 1895.
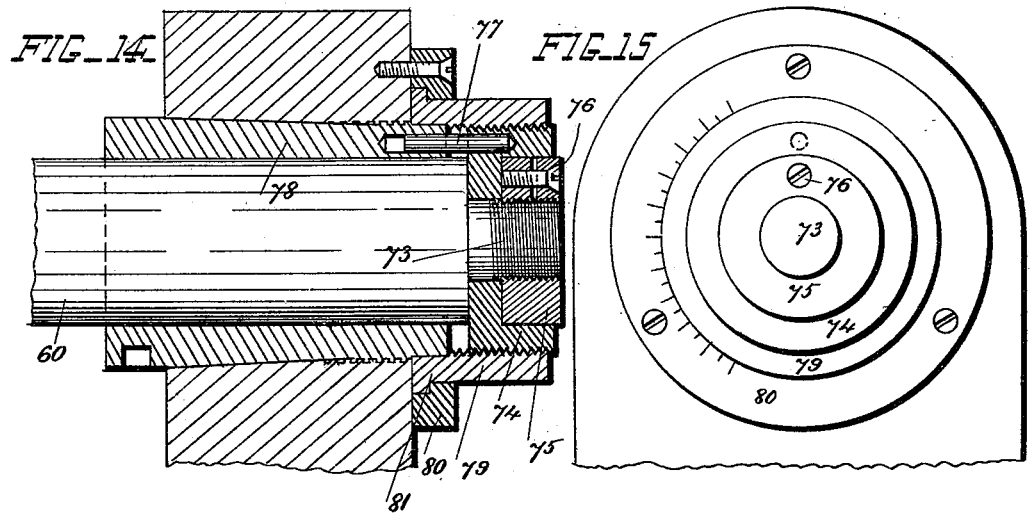
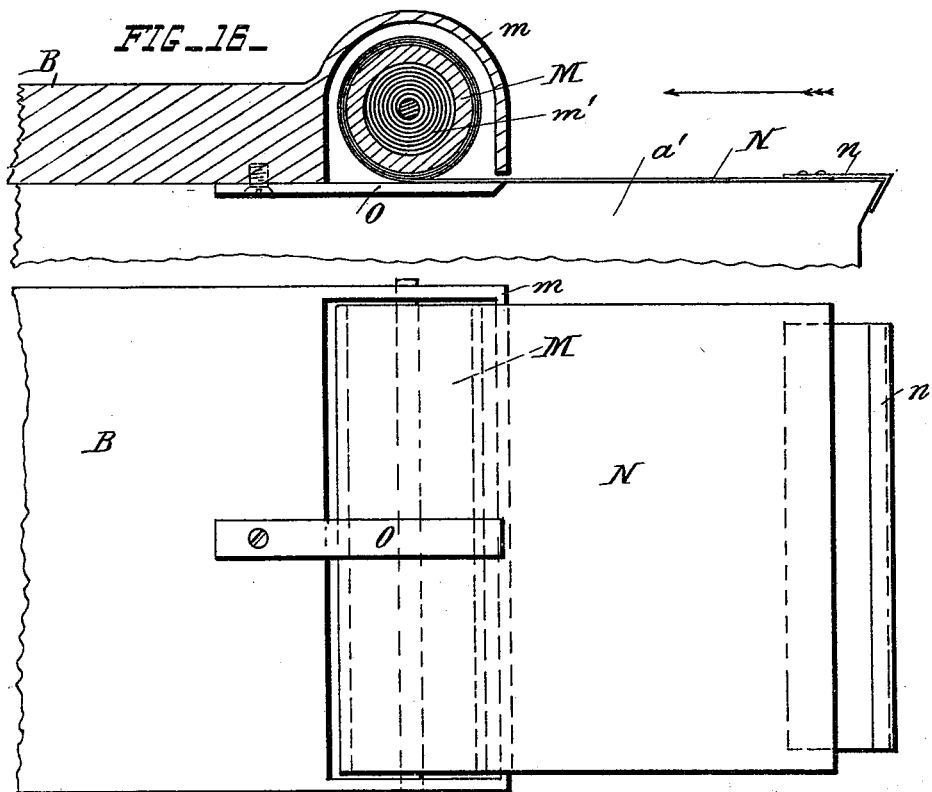
WITNESSES
W. H. Ronsaville
J. Chugg Poole
INVENTOR
Abraham B. Landis
by Herbert W. T. Jenner.
Attorney

UNITED STATES PATENT OFFICE.

ABRAHAM B. LANDIS, OF WAYNESBOROUGH, PENNSYLVANIA.

GRINDING-MACHINE.

SPECIFICATION forming part of Letters Patent No. 544,439, dated August 13, 1895.

Application filed January 31, 1895. Serial No. 536,805. (No model.)

*To all whom it may concern:*

Be it known that I, ABRAHAM B. LANDIS, a citizen of the United States, residing at Waynesborough, in the county of Franklin and State of Pennsylvania, have invented certain new and useful Improvements in Grinding-Machines; and I do hereby declare the following to be a full, clear, and exact description of the invention, such as will enable others skilled in the art to which it appertains to make and use the same.

This invention relates to grinding-machines; and it consists in the novel construction and combination of the parts hereinafter fully described and claimed.

In the drawings, Figure 1 is a front view of the grinding-machine. Fig. 2 is a plan view of the grinding-machine. Fig. $2^a$ is a side view of the grinding-wheel bracket, showing the supporting-plates in section. Fig. 3 is a plan view of the head-stock, showing its spindle-bearings in section. Fig. 4 is a cross-section through the head-stock, taken on the line 2 2 in Fig. 3. Fig. 5 is a detail front view of the keeper-ring. Fig. $5^a$ is a side view of the driving-pulley 31, separate from the ring 37. Fig. 6 is a cross-section through the foot-stock, taken on the line 3 3 in Fig. 7. Fig. 7 is a longitudinal section through the foot-stock, taken on the line 4 4 in Fig. 6. Fig. 8 is a cross-section through the water-fender. Fig. 9 is a plan view of the device for adjusting the emery-wheel. Fig. 10 is a longitudinal section taken on the line 5 5 in Fig. 9. Fig. $10^a$ is a cross-section taken on the line 6 6 in in Fig. 10 and looking toward the hand-wheel. Fig. 11 is a detail side view of the emery-wheel fender. Fig. 12 is a front view of the emery-wheel fender. Fig. 13 is a cross-section through the water-nozzle, taken on the line 7 7 in Fig. 11. Fig. 14 is a longitudinal section through one of the bearings which support the grinding-wheel spindle. Fig. 15 is an end view of the same. Fig. 16 is a longitudinal section through a portion of the sliding carriage that carries the emery-wheel and a portion of the bed whereon it slides, showing the spring-actuated dust-protector for the guides on the bed. Fig. 17 is a plan view of the same.

A is the bed of the machine provided with guides $a'$ at the back for the carriage B to slide on.

B' is the emery-wheel support, which is arranged above the carriage B and provided with means for moving it transversely and swiveling it around in any approved manner.

C is a table pivoted by a pin $c$ to the top of the bed and provided with any approved means for clamping it to the bed.

D is the head-stock at one end of the table C, and E is the foot-stock at the other end of the table.

C' is a water-pan in the top of the table, extending behind the head-stock and foot-stock when moved farthest apart.

D' is the base portion of the head-stock, provided with a flange $d'$, bearing against the front edge of the table, and 10 is a curved bolt provided with a head 11 sliding in a longitudinally-recessed groove 12 in the table. The screw-threaded end of the bolt 10 projects at the front of the base and is provided with a nut 13. The base may be slid longitudinally of the table and clamped by the bolt 10, which also draws the flange $d'$ against the edge of the table, and thereby secures the alignment of the head-stock spindle with the foot-stock spindle.

F is a bracket pivoted on the vertical pin $f$, which projects from the base D', and $f'$ is a nut on the pin $f$ for clamping the bracket F in position after it has been adjusted. The bracket F is provided with bearings 15 for supporting the spindle G of the head-stock. The spindle G runs in bushes $g$, which are let into the bearings 15. These bushes are of different lengths, but otherwise are similar to each other. Each bush is provided with a longitudinal split or groove 16, cut through it on one side, and external grooves 17, partially cut through it and permitting it to be contracted upon the spindle. Each bush is tapered on the outside and has screw-threads 18 upon one end. The bearing is correspondingly tapered and screw-threaded and the bush is adjusted to the spindle by turning it in its bearing. The projecting end of the bush is provided with holes or other equivalent devices, with which a wrench or key may engage for the purpose of turning it. The bearings 15 are arranged to overhang the water-pan and the bracket F may be swiveled around, as indicated by the dotted lines in Fig. 2, or placed in any intermediate position. When in the position shown in full lines, the head-stock is adapted for grinding shafts and when in the position shown in dotted lines it is adapted for face-grinding. Owing to the position of the pivot on the front side of the bracket, the center 19 in the front end of the spindle is kept substantially upon the center line between the head-stock and foot-stock and the material to be ground is held over the water-pan in whatever position the bracket is placed. The grinding-wheel does not have to be moved back when the head-stock is turned around and in a position to do face-grinding. The clamping-nut $f'$ is above and in front of the head-stock spindle, and is therefore in a very convenient and accessible position. The spindle is retained endwise in its bearings by means of the collar 20, secured on the spindle between the bearings by means of the set-screw 21. A washer 22 is interposed between the collar and the rear end bearing, and 23 is an adjusting-nut screwed on the end of the spindle in contact with the said bearing. A locking-screw 24 passes through the bracket F and enters a slot 25 in the collar 20, so that the spindle may be prevented from revolving when desired.

The front end of the spindle G is provided with a conical portion 26, a cylindrical portion 27, and a ratchet-toothed screw-thread 28. The center 19 fits into a hole in the end of the spindle in the ordinary manner. A sleeve 30 is screwed upon the screw-thread 28 and engages with the conical portion 26. The inclined portion of the screw-thread forms a spiral cone, arranged in the reverse direction to the conical portion 26, and when the sleeve is screwed up the two cones hold it absolutely concentric with the spindle. A driving-pulley 31, provided with a driving-disk 32 and drivers 33 for revolving the work, is secured upon the sleeve 30 by means of a set-screw 34. A circumferential groove 35 is formed in the sleeve, and 36 is a keeper-ring, formed in halves and placed in the said groove. The point 34' of the set-screw is tapered and engages with a screw-threaded and tapered hole formed in the ring at the junction of its parts. When the set-screw is tightened up, it expands the parts of the ring, and thereby secures the pulley on the sleeve. A ring 37 is secured to the periphery of the disk 32, and is used as a driving-pulley when the driving-pulley 31 is not large enough for a given piece of work. The ring 37 is provided with drivers, a shoulder 38, and a set screw 39 for securing it in position. The ring 37 is easily removed when not required to be used.

E is the foot-stock arranged at the other end of the table C and provided with a flange $h$ bearing against the front edge of the table.

H is an inclined bolt provided with a head $h'$, sliding in the longitudinal recessed groove 12 in the table, and H' is a nut on the end of the bolt for clamping the foot-stock to the table and drawing up the flange $h$ against the edge of the table to insure the alignment of the foot-stock spindle with the head-stock spindle.

I is the foot-stock spindle, which slides in the bearing $i$ of the foot-stock and is provided with a center $i'$ in the usual manner.

I' is a nut on the rear end of the spindle I to prevent it from being pushed too far forward.

J is a cavity in the foot-stock, and $j$ is a lever pivoted in the cavity on the pins $j'$. One end of this lever engages with a notch 40 in the spindle I and the other end bears against a pin 41, which is slidable in a hole 42 in the foot-stock. A spring 43 is placed in the hole 42 for forcing the spindle I forward, and 44 is a screw behind the spring 43 for adjusting its tension. The lever $j$ is provided with a handle J' for operating it and retracting the spindle I.

In order to prevent dirt from entering the bearing $i$, it is provided at its front end with an extension 45, having an internal circumferential groove 46. The front part of this extension bears lightly around the front end of the spindle, beyond its bearing portion, and the spindle I has a circumferential groove 47, which comes opposite the groove 46 when the spindle is drawn back. The bearing $i$ and the extension 45 have a slot 48 in their under side for their full length, and 49 are screws for drawing together the edges of the slot and adjusting the bearing to the spindle. The front end portion of the spindle slides back and forth in the extension 45, and any dirt or water that may be drawn in by the spindle is retained in the groove 46 and falls through the slot 48 without ever reaching the bearing $i$.

K is the water-fender, which consists of a series of concavo-convex plates $k$, provided with hooked eyes $k'$ at their upper edges. These plates are strung upon a rod K', whose ends are supported in holes in the head-stock and in the foot-stock. The plates $k$ preferably overlap each other slightly, and when the foot-stock is moved toward the head-stock the plates telescope one over the other to a limited extent. More plates can be placed on the rod as required, as they are easily placed on it or removed from it. Curved flanges 50 are formed on each side of the head-stock and on the left side of the foot-stock for holding the end plates in position, and the plates $k$ can be applied on both sides of the head-stock, if desired. The flanges 50 overlap the end plates and prevent water from passing between the end plates and the head-stock and foot-stock. The bottom edges of the plates rest against the top of the table and the water which falls on the fender runs off into the water-pan.

The position of the emery or grinding wheel is adjusted by means of devices substantially the same as described in the Patent No. 483,288, issued to me on September 27, 1892, and as shown in Fig. 2ª. These devices consist essentially of a revoluble plate 90, pivoted to the carriage B by the pin 90', and provided with a toothed rack 91, a plate 93, slidable longitudinally on the plate 90 and supporting the grinding-wheel bracket 94, and the shaft 94', provided with a toothed pinion gearing into the said rack. A worm-wheel 96 is operatively connected to the shaft 94', and is revolved by the worm 95. The bracket R, which supports the shaft of the said worm, is provided with a longitudinally-slotted lug 51 at its outer end. The hand-wheel 52, which is secured on the end of the worm-shaft, is provided with a countersunk recess on one side, and 53 is an adjustable stop-dog, journaled on the worm-shaft next to the said recess. A clamping-bolt 54 is provided with an inclined end 55, which engages with the countersunk recess, and 56 is a thumb-nut for securing the said dog and hand-wheel together by means of the bolt 54 after the position of the dog has been adjusted. A stop-bar 57 is slidable longitudinally in the lug 51 into the path of the stop-dog, and 58 is a pin engaging with a groove in the stop-bar and preventing it from slipping out of the slot. The stop-bar is drawn back whenever it is desired to move back the emery-wheel some distance from the work without disconnecting the stop-dog from the hand-wheel.

The spindle 60 of the emery-wheel 61 runs in bearings 62, which are preferably constructed the same as the bearings of the head-stock spindle hereinbefore described, and the disk 63, to which the emery-wheel 61 is secured, is preferably attached to the end of the spindle 60 in the same manner as the driving-disk is attached to the end of the head-stock spindle and hereinbefore described.

The emery-wheel is provided with a water-fender 65, which has a lug 66 for securing it to the emery-wheel support. The fender is trough-shaped in cross-section and extends over the lower, rear, and upper parts of the periphery of the emery-wheel. The upper and front part of the fender 65 is provided with curved dovetailed guides 67, and 68 is a curved nozzle, to which the flexible water-pipe 69 is attached. The nozzle 68 has curved projections 70 on its sides, which engage with the guides 67, and the under side of the nozzle forms an extension of the water-fender.

The nozzle 68 is provided with a valve 71 of any approved construction for regulating the flow of water through it, and the water-pipe 69 rests on the top of the fender and holds the nozzle in any position in the guides. The nozzle is slid back and forth in the guides to adapt it to the size of the work in front of the emery-wheel.

The spindle or shaft upon which the emery-wheel is secured is provided with means for adjusting it longitudinally in its bearings, in order that the emery-wheel may be adjusted laterally for grinding shoulders on shafts and for other similar purposes. The means for adjusting the emery-wheel shaft are shown in Figs. 14 and 15. The spindle 60 is provided with a screw-threaded end portion 73 of smaller diameter than the body of the spindle, and 74 is a screw-threaded collar journaled on the end 73 and held in position by means of the nut 75, which engages with the screw-threaded end. The nut 75 is locked in any approved manner—such as, for instance, by means of a screw 76, a slot having been cut through the nut on one side, so that the screw 76 draws together the parts of the nut on the opposite sides of the slot when tightened. A pin 77 is secured in the collar 74 and projects into a hole in the end of the bush 78 of the bearing, so that the collar is not free to revolve, but may be slid longitudinally. A revoluble sleeve 79 is screw-threaded internally and engages with the screw-thread on the collar 74. A recessed ring 80 is secured to the end of the bearing and engages with a flange 81 on the end of the sleeve 79. The adjacent surfaces of the sleeve and ring have a mark and graduations to indicate the extent of the adjustment, and the spindle is adjusted longitudinally by turning the sleeve 79 to the right or to the left, as required.

The guides $a'$, upon which the carriage B is slid back and forth, are substantially the same as those shown in the Patent No. 483,288, hereinbefore referred to. In order to keep these guides clear of dust and dirt which otherwise would fall upon them, a roller M is journaled in bearings at one end of the carriage within the casing $m$, which is a part of the carriage or which may be otherwise secured to it. The roller M is hollow and is provided with an internal spring $m'$ for winding it in one direction.

N is a flexible guard wound upon the periphery of the roller and provided with a hooked plate $n$ at its front end. The hooked plate engages with the end of the bed when the carriage is moved in the direction of the arrow and the guard is unwound from the roller and stretched over the guides. The guard is wound up by the spring when the carriage is moved in the reverse direction.

O is a plate secured to the under side of the carriage between the guides. When the carriage moves beyond the end of the guides, this plate engages with the hooked plate $n$, prevents it from being drawn into the casing $m$, and holds it in a position to re-engage with the end of the bed when the carriage is again moved in the direction of the arrow. A similar spring-actuated roller and dust-guard are arranged at the other end of the carriage.

What I claim is—

1. In a grinding machine, the combination, with a revoluble spindle provided at one end with a conical portion, and a ratchet-toothed screwthread, the apices of the said conical portion and of the spiral cone of the screw-thread being pointed toward each other; of a carrying device, such as a sleeve or hub, fitting on the said conical portion and screwthread, and thereby held absolutely concentric with the spindle, substantially as set forth.

2. In a grinding machine, the combination, with the revoluble headstock spindle, and a sleeve secured on its front end and provided with a circumferential groove; of a keeper ring formed in parts and provided with a tapered hole at the junction of two parts, a disk on the sleeve, and a screw provided with a tapered point engaging with the said tapered hole and operating to secure the said disk to the sleeve, substantially as set forth.

3. In a grinding machine, the combination, with the revoluble headstock spindle, and the driving disk carried thereby; of a ring provided with a shoulder and secured on the periphery of the driving disk, and operating as a supplemental driving pulley and driving disk, substantially as set forth.

4. In a grinding machine, the combination, with the headstock provided with two bearings, and the headstock spindle journaled therein; of a collar, for taking the end thrust, secured on the spindle between its bearings and provided with a slot in its periphery, and a locking screw engaging with the headstock and adapted to enter the said slot, substantially as set forth.

5. In a grinding machine, the combination, with the footstock, and its spindle; of a lever engaging with the said spindle, pivoted to the footstock and provided with a handle for operating it; and a spring-actuated pin bearing against the said lever and normally holding the spindle forced forward in the footstock, substantially as set forth.

6. In a grinding machine, the combination, with the footstock, and its spindle; of a lever pivoted in a cavity in the footstock, engaging with the said spindle, and provided with a projecting handle for operating it; a spring-pressed pin carried in a hole in the footstock and bearing against the lever, and a screw for adjusting the pressure of the spring on the lever, substantially as set forth.

7. In a grinding machine, the combination, with the table, and the headstock; of a rod carried by the headstock parallel with the table, and a water fender consisting of a series of curved plates having eyes engaging with the said rod, and having their lower portions resting on the table, substantially as set forth.

8. In a grinding machine, the combination, with the table, and the headstock provided with a curved flange on its side; of a rod slidable in a hole in the headstock parallel with the table, and the curved end plate of the water fender having an eye engaging with the said rod, passing under the said flange, and resting on the table, substantially as set forth.

9. In a grinding machine, the combination, with the bracket R provided with a longitudinally slotted lug at its outer end, and the shaft, for adjusting the position of the emery wheel, journaled in the said bracket; of a hand wheel secured on the end of the said shaft, an adjustable stop dog, and means for clamping it to the hand wheel; and a retractible stop bar slidable in the said slotted lug and projecting into the path of the stop dog, substantially as set forth.

10. In a grinding machine, the combination, with the emery wheel spindle, and its bearing; of a non-revoluble collar splined to said bearing and journaled on the end of the spindle, movable endwise with it, and provided with an external screwthread; a recessed ring secured to the end of the bearing; and a sleeve for adjusting the spindle longitudinally, journaled in the said ring and engaging with the said screwthread, substantially as set forth.

11. In a grinding machine, the combination, with the emery wheel spindle, and its bearing; of a non-revoluble collar splined to the said bearing and journaled on the end of the spindle, an adjustable nut screwed on the end of the spindle and operating to hold the said collar in position; a recessed ring secured to the end of the bearing; and a sleeve, for adjusting the spindle longitudinally, journaled in the said ring and provided with an internal screwthread engaging with a similar screwthread on the periphery of the said collar, substantially as set forth.

12. In a grinding machine, the combination, with the table C provided with the water pan C′ in its rear part, of the slidable base portion D′ of the headstock secured to the front portion of the said table, the bracket F pivoted on the vertical pin $f$ projecting from the base D′ and provided with a clamping nut, the said bracket having bearings 15 for the headstock spindle projecting rearwardly over the said water pan, and the said pin $f$ being arranged at the front part of the said bracket, whereby the work supported by the headstock is held over the said water pan whether the said bracket is placed in position for face grinding or for shaft grinding or in intermediate positions, substantially as set forth.

13. In a grinding machine, the combination, with the emery wheel spindle 60 provided with the screwthreaded end 73 smaller in diameter than the spindle, and the nut 75 on the said end; of a bearing for the said spindle, a recessed ring 80 secured to the said bearing, the internally screwthreaded sleeve 79 journaled in the said ring, the screwthreaded collar 74 journaled on the said spindle-end 73 and engaging with the said sleeve, and the pin 77 engaging with holes in the said bearing and collar and preventing the collar from revolving when the sleeve 79 is revolved, substantially as set forth.

14. In a grinding machine, the combination, with the footstock provided with a bearing $i$ and an extension 45 and a groove 46 at its front end; of the spindle I provided with the groove 47 at its front end opposite the groove 46, and means for retracting the said spindle, substantially as set forth.

15. The combination, with the stationary guides on the bed of the machine, and the carriage slidable longitudinally on the said guides; of a roller carried by the said carriage, a spring operating to revolve the said roller and a dust guard of flexible material wound on the said roller and provided at its free end with means for engaging the end of the bed, substantially as set forth.

16. The combination, with the stationary guides on the bed of the machine, and the carriage slidable longitudinally on the said guides; of a spring-actuated roller carried by the said carriage, a dust guard of flexible material wound on the said roller and provided at its free end with a hooked plate for engaging with the end of the bed, and a plate secured to the under side of the carriage and operating to engage with the said hooked plate and hold it in position when the end of the carriage slides beyond the end of the guides, substantially as set forth.

In testimony whereof I affix my signature in presence of two witnesses.

ABRAHAM B. LANDIS.

Witnesses:
J. E. FRANTZ,
T. S. CUNNINGHAM.